(12) United States Patent
Achleitner et al.

(10) Patent No.: US 9,812,988 B2
(45) Date of Patent: Nov. 7, 2017

(54) METHOD FOR CONTROLLING AN INVERTER, AND INVERTER

(71) Applicant: Fronius International GmbH, Pettenbach (AT)

(72) Inventors: Guenter Achleitner, Sattledt (AT); Bernhard Artelsmair, Pettenbach (AT); Andreas Pamer, Wallern a.d. Trattnach (AT)

(73) Assignee: Fronius International GmbH, Pettenbach (AT)

( * ) Notice: Subject to any disclaimer, the term of this patent is extended or adjusted under 35 U.S.C. 154(b) by 8 days.

(21) Appl. No.: 14/772,937

(22) PCT Filed: Feb. 28, 2014

(86) PCT No.: PCT/AT2014/050046
§ 371 (c)(1),
(2) Date: Sep. 4, 2015

(87) PCT Pub. No.: WO2014/134647
PCT Pub. Date: Sep. 12, 2014

(65) Prior Publication Data
US 2016/0020706 A1    Jan. 21, 2016

(30) Foreign Application Priority Data
Mar. 5, 2013 (AT) .............................. A 50145/2013

(51) Int. Cl.
*H02M 7/538* (2007.01)
*H02M 7/537* (2006.01)
(Continued)

(52) U.S. Cl.
CPC ........... *H02M 7/537* (2013.01); *H02M 3/155* (2013.01); *H02M 2001/0058* (2013.01); *H02M 2007/4811* (2013.01); *Y02B 70/1491* (2013.01)

(58) Field of Classification Search
CPC .............. H02M 3/337; H02M 7/5375; H02M 3/33569; H02M 7/5387; H02M 3/383; H02M 7/4826; Y02B 70/1433
(Continued)

(56) References Cited

U.S. PATENT DOCUMENTS 5,172,309 A * 12/1992 DeDoncker ......... H02M 7/4826
363/132
5,546,295 A * 8/1996 Prete ..................... H02M 3/337
363/17
(Continued)

FOREIGN PATENT DOCUMENTS

AT           505 801 A1     4/2009
CN          101610038 A    12/2009
(Continued)

OTHER PUBLICATIONS

Arun et al. "Improved active power factor correction circuit using a Zero-Voltage-Switching Boost converter", IEEE Transactions on Power Electronics, institute of Electrical and Electronics Engineers, USA,vol. 13, No. 2, Mar. 1, 1998 pp. 308,310.*

(Continued)

*Primary Examiner* — Rajnikant Patel
(74) *Attorney, Agent, or Firm* — Collard & Roe, P.C.

(57) ABSTRACT

The invention relates to a method for controlling an inverter and to an inverter a DC/DC stage, which comprises at least one main switch (S2) and a discharge circuit, and with a DC/AC stage. The discharge circuit is formed by a series connection of a bidirectional switching element, which comprises two switches (SA1, SA2), and an inductivity. A device is provided for controlling the switches (SA1, SA2) and is designed such that one switch (SA1, SA2) is activated in an alternating manner and the switch-on time of the (Continued)

switch is determined by the controlling device prior to a switch-off time of the main switch (S2).

5 Claims, 3 Drawing Sheets

(51) Int. Cl.
    *H02M 3/155*     (2006.01)
    *H02M 1/00*     (2006.01)
    *H02M 7/48*     (2007.01)

(58) Field of Classification Search
    USPC .......... 363/16–17, 37, 39, 41, 56.03, 65, 98,
                              363/132; 307/64, 66, 77, 82
    See application file for complete search history.

(56) References Cited

U.S. PATENT DOCUMENTS

| 6,111,770 | A | * | 8/2000 | Peng | H02M 7/4826 |
| | | | | | 363/131 |
| 6,643,157 | B2 | | 11/2003 | Furukawa et al. | |
| 6,697,274 | B2 | * | 2/2004 | Bernet | H02M 7/487 |
| | | | | | 363/132 |
| 7,379,309 | B2 | * | 5/2008 | Isurin | H02M 1/36 |
| | | | | | 363/17 |
| 2004/0095790 | A1 | | 5/2004 | Bakran et al. | |
| 2007/0247123 | A1 | | 10/2007 | Bocchiola | |
| 2008/0094866 | A1 | | 4/2008 | Bauman et al. | |
| 2010/0202176 | A1 | | 8/2010 | Hallak | |
| 2011/0222325 | A1 | | 9/2011 | Komatsu | |

FOREIGN PATENT DOCUMENTS

| DE | 102 18 305 A1 | 11/2002 |
| DE | 101 31 961 A1 | 1/2003 |
| DE | 10 2011 004 898 A1 | 9/2011 |
| EP | 2 393 153 A1 | 12/2011 |
| JP | 2004-363997 A | 12/2004 |

OTHER PUBLICATIONS

Arun et al. "Improved active power factor correction circuit using a Zero-voltage-Switching Boost converter" IEEE Transactions on Power Electronics institute of Electrical and Electronic Engeneers, USA vol. 13, No. 2, Mar. 1, 1998 pp. 208,310.*
International Search Report of PCT/AT20141050046, dated Jul. 8, 2014.
Austrian Office Action in A 50145/2013, dated Jan. 16, 2014, with English translation of relevant parts.
Arun et al., "Improved Active Power-Factor-Correction Circuit Using a Zero-Voltage-Switching Boost Converter", IEEE Transactions on Power Electronics, Institute of Electrical and Electronics Engineers, USA, vol. 13, No. 2, Mar. 1, 1998, pp. 308, 310.
Kui-Jun Lee et al., "Nonisolated ZVT Two-Inducer Boost Converter with a Single Resonant Inductor for High Step-Up Applications," IEEE Transactions on Power Electronics, Institute of Electrical and Electronics Engineers, USA, vol. 27, No. 4, Apr. 1, 2012, pp. 1966-1967, 1969.

* cited by examiner

METHOD FOR CONTROLLING AN INVERTER, AND INVERTER

CROSS REFERENE TO RELATED APPLICATIONS

This application is the National Stage of PCT/AT2014/050046 filed on Feb. 28, 2014, which claims priority under 35 U.S.C. §119 of Austrian Application No. A 50145/2013 filed on Mar. 5, 2013, the disclosure of which is incorporated by reference. The international application under PCT article 21(2) was not published in English.

The invention relates to a method for controlling an inverter, and to an inverter, in particular a photovoltaic inverter.

The object of the invention consists in achieving a switching discharge of the main switch and thus a higher level of efficiency and power density.

The object is solved by a method for controlling an inverter with a DC/DC stage, which comprises at least one main switch (S2) and a discharge circuit, and with a DC/AC stage, wherein the discharge circuit is formed by a series connection of a bidirectional switching element, which comprises two switches (SA1, SA2), and an inductivity, and wherein the switches (SA1, SA2) are controlled such that one switch (SA1, SA2) is activated in an alternating manner and the switch-on time of the switch is determined by the controlling device prior to a switch-off time of the main switch (S2).

The object is also solved by an inverter with a DC/DC stage, which comprises at least one main switch (S2) and a discharge circuit, and a DC/AC stage, wherein the discharge circuit is formed by a series connection of a bidirectional switching element, which comprises two switches (SA1, SA2), and an inductivity, and wherein a device for controlling the switches (SA1, SA2) is provided and is designed such that one switch (SA1, SA2) is activated in an alternating manner and the switch-on time of the switch is determined by the controlling device prior to a switch-off time of the main switch (S2).

It is of advantage that the provision of an auxiliary voltage source which is necessary for the discharge circuit is performed without additional components, so that losses and costs are kept to a minimum. Correspondingly, this has a positive effect on the level of efficiency. Furthermore, a symmetrical distribution of the voltages at the capacitors/electrolytic capacitors in the intermediate circuit can be achieved, so that the level of efficiency is also improved.

Figure 1:
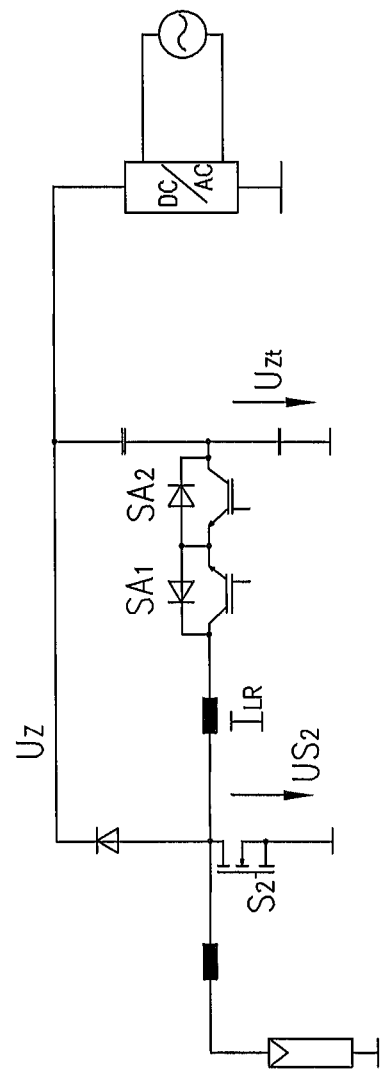
FIG. 1 shows a circuit according to the invention.

The circuit according to the invention pursuant to FIG. 1 will now be described in the following.

The basic circuit is correspondingly a boost converter, wherein two capacitors and/or electrolytic capacitors are connected in series at the output. Thus, an output node is generated between the capacitors. It is also possible to use only the lower capacitor. The discharge circuit is arranged between the center and the node of the input inductivity, the switch S2, and the diode of the boost converter. The input inductivity is correspondingly supplied by at least one solar generator and/or solar module. The discharge circuit comprises a series connection of an inductivity and a bidirectional switching element, comprising the switches SA1 and SA2.

At the output node the partial voltage Uzt is tapped, wherein the intermediate circuit voltage Uz is applied across both capacitors.

The voltage Us2 which has an influence on the controlling method is tapped at the node. Furthermore, the current through the inductivity of the discharge circuit ILr is also relevant. The inductivity may also be designed as a resonant inductor.

Figure 2:
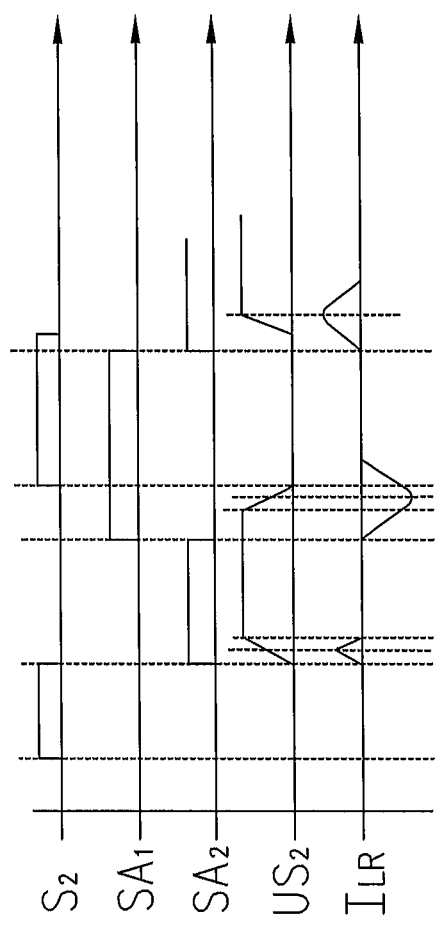
FIG. 2 shows the controlling method for the circuit of FIG. 1.

The controlling method will now be described in more detail by means of FIG. 2.

After the first switching cycle of the main switch S2—i.e. after the switching off—the voltage Us2 increases since the input inductivity maintains the current flow via the diode. With the switching off of S2, SA2 is switched on at the same time, so that the current ILR starts to flow through the inductivity of the discharge circuit. After Us2 has reached the partial voltage Uzt, the current ILR reverses again and drops to zero. Us2 correspondingly remains at the value of the intermediate circuit voltage Uz until SA2 is switched off and SA1 is switched on. At that time, the inductivity of the discharge circuit starts to charge in the opposite direction, as may be seen in the course of ILR. Likewise, substantially at this time the voltage Us2 starts to decrease and the switch SA1 is switched on.

After Us2 has dropped to zero, the main switch S2 can be switched on loss-free, i.e. voltage-free, and the next cycle starts. The balance of energy of ILR within a cycle is relevant. This means that the positive half cycle and the negative half cycle should be identical, i.e. add up to zero. If this is the case, the partial voltage Uzt is the half of Uz. Thus, the relation of intermediate circuit voltage to partial voltage would be 2:1, which is required. If this is not the case, as illustrated, Uzt has a higher value.

Thus, the control aims to decrease the value of Uzt in the next cycle. In accordance with the invention this is achieved in that SA2 is switched on before S2 is switched off. The effect thereof is that the inductivity of the discharge circuit is charged longer and the partial voltage Uzt correspondingly decreases.

Accordingly, the switch-on time of SA2 is adapted in each cycle until the relation of 2:1 is reached. Thus, the voltages at the capacitors are substantially kept on the same level. The difference between the switch-on time of SA2 and the switch-off time of S2 is thus adapted in accordance with the current ratio of Uz to Uzt. Depending on the switching frequency the difference lies in the range of some hundred ns. The controlled variable is the difference voltage of Uz to Uzt.

It is to be understood that the diode may also be replaced by a switch such as, for instance, MOSFETs.

Likewise, ILR may also be referred to as a controlled variable in that the sum per cycle is controlled to zero.

Figure 3:
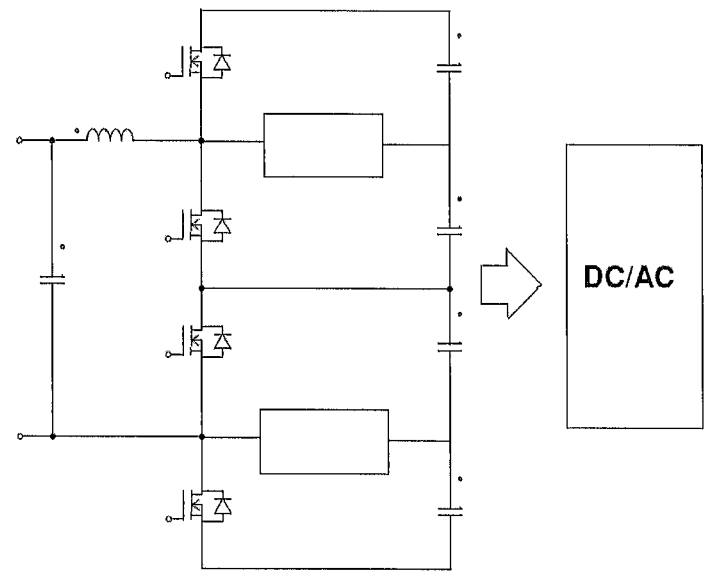
FIG. 3 shows a multi-level DC/DC stage.

By way of example this is illustrated in FIG. 3 which shows a multi-level DC/DC stage. It serves in particular for three-phase DC/AC stages with higher input voltage ranges.

If the discharge circuit is used in a boost converter, the functions of SA1 and SA2 will have to be exchanged.

If the discharge circuit is used in a DC/AC stage, like a bridge circuit, the function of SA1 and SA2 and the control thereof is adapted as a function of the functioning used at that moment, i.e. either boost converter or buck converter.

The following Figures illustrate DC/AC stages which may be combined with the circuit in accordance with the invention. The blocks constitute the discharge circuit.

Figure 4:
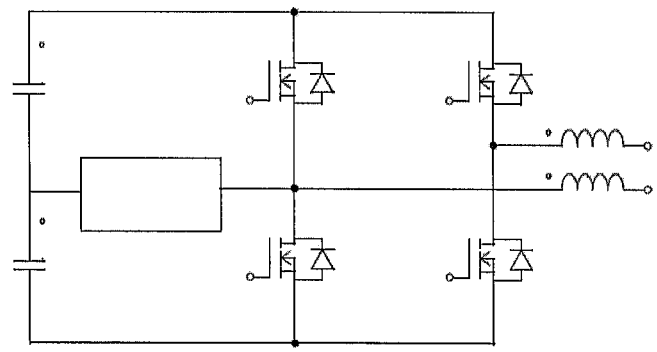
FIG. 4 shows a single-phase DC/AC stage which may be combined with the circuit according to FIG. 1.

FIG. 4 illustrates a single-phase DC/AC stage with a H4 bridge which may, for instance, be used in a so-called micro inverter directly at the solar module.

Figure 5:
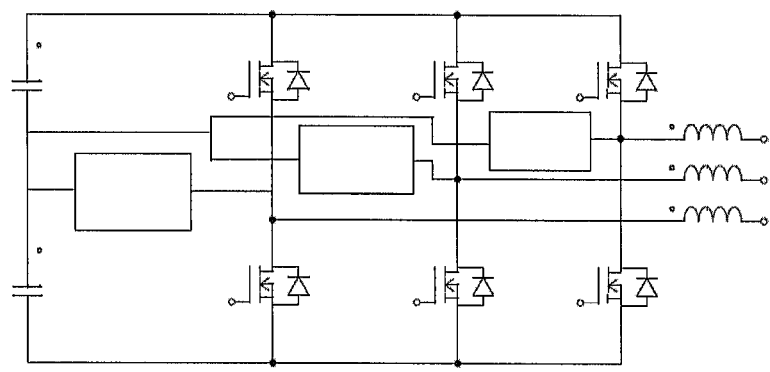
FIG. 5 shows a B6 circuit for three-phase DC/AC stages.

FIG. 5 illustrates a B6 circuit for three-phase DC/AC stages.

Figure 6:
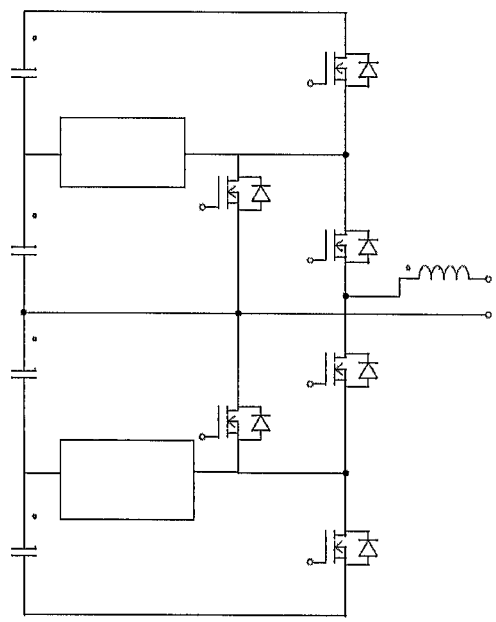
FIG. 6 shows a circuit topology for single-phase and three-phase DC/AC stages, wherein the neutral conductor or star point is on half the intermediate circuit voltage.

FIG. 6 finally illustrates a circuit topology for single-phase and three-phase DC/AC stages, wherein here the neutral conductor or star point is on half the intermediate circuit voltage. A so-called static generator is of advantage here.

The invention claimed is:

1. A method for controlling an inverter with a DC/DC stage, which comprises at least one main switch (S2), an intermediate circuit, and a DC/AC stage, wherein the main switch (S2) is discharged by a discharge circuit, wherein the discharge circuit is arranged between the main switch (S2) and the center of two capacitors connected in series in the intermediate circuit, at which capacitors the intermediate circuit voltage (Uz) and at the center of which a partial voltage (Uzt) of the intermediate circuit voltage is applied, and is formed by a bidirectional circuit of first and second switches (SA1, SA2) and an inductivity in series, and the intermediate circuit voltage (Uz) at the output of the DC/DC stage and the partial voltage (Uzt) are detected, and wherein the first and second switches (SA1, SA2) of the discharge circuit are controlled such that the first and second switches (SA1, SA2) are activated in an alternating manner, the second switch (SA2) is switched on before the main switch (S2) is switched off and a current starts to flow through the inductivity of the discharge circuit until a voltage (US2) reaches the partial voltage (Uzt) and the current reverses and drops to zero, the voltage (US2) remains at the value of the intermediate circuit voltage (Uz) until the second switch (SA2) is switched off and the first switch (SA1) is switched on, and the inductivity of the discharge circuit starts to charge in an opposite direction, the main switch (S2) is switched on voltage-free after the voltage (US2) at the main switch (S2) has dropped to zero, and the switch-on time of the second switch (SA2) is determined prior to the switching off of the main switch (S2) as a function of a relation of the intermediate circuit voltage (Uz) to the partial voltage (Uzt), and the switch-on time of the second switch (SA2) is adapted in each cycle until the partial voltage (Uzt) is half of the intermediate circuit voltage (Uz), such that a relation of 2 to 1 is reached.

2. The method according to claim 1, wherein the switch-on time of the second switch (SA2) is determined prior to the switching off of the main switch (S2) as a function of a ratio of the intermediate circuit voltage (Uz) to the partial voltage (Uzt) of 2:1.

3. An inverter with a DC/DC stage, which comprises at least one main switch (S2), an intermediate circuit, and with a DC/AC stage, wherein a discharge circuit is provided for discharging the main switch (S2), wherein the discharge circuit is arranged between the main switch (S2) and the center of two capacitors connected in series in the intermediate circuit, at which capacitors the intermediate circuit voltage (Uz) and at the center of which a partial voltage (Uzt) of the intermediate circuit voltage is applied, and is formed by a bidirectional circuit of first and second switches (SA1, SA2) and an inductivity in series, and wherein a device is provided for controlling the switches (SA1, SA2) of the discharge circuit and the controlling device is designed such that the first and second switches (SA1, SA2) are activated in an alternating manner, the second switch (SA2) is switched on before the main switch (S2) is switched off and a current starts to flow through the inductivity of the discharge circuit until a voltage (US2) reaches the partial voltage (Uzt) and the current reverses and drops to zero, the voltage (US2) remains at the value of the intermediate circuit voltage (Uz) until the second switch (SA2) is switched off and the first switch (SA1) is switched on, and the inductivity of the discharge circuit starts to charge in an opposite direction, the main switch (S2) is switched on voltage-free after the voltage (US2) at the main switch (S2) has dropped to zero, and the second switch (SA2) is switched on at a switch-on time of the second switch determined prior to the switching off of the main switch (S2) as a function of a relation of the intermediate circuit voltage (Uz) to the partial voltage (Uzt), and the switch-on time of the second switch (SA2) is adapted in each cycle until the partial voltage (Uzt) is half of the intermediate circuit voltage (Uz), such that a relation of 2 to 1 is reached.

4. The inverter according to claim 3, wherein the DC/DC stage is a boost converter.

5. The inverter according to claim 3, wherein the DC/DC stage is a buck converter.

* * * * *